United States Patent
Sakamoto et al.

(10) Patent No.: US 11,641,026 B2
(45) Date of Patent: May 2, 2023

(54) ALL-SOLID-STATE BATTERY MANUFACTURING APPARATUS AND ALL-SOLID-STATE BATTERY MANUFACTURING METHOD

(71) Applicant: TOYOTA JIDOSHA KABUSHIKI KAISHA, Toyota (JP)

(72) Inventors: Takuya Sakamoto, Toyota (JP); Yuki Nishibu, Seto (JP); Tomoya Hioki, Toyota (JP); Masato Ono, Nagoya (JP); Yosuke Koide, Nagoya (JP); Kazumasa Inata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 17/340,347

(22) Filed: Jun. 7, 2021

(65) Prior Publication Data
US 2022/0013805 A1    Jan. 13, 2022

(30) Foreign Application Priority Data
Jul. 9, 2020 (JP) .............................. JP2020-118341

(51) Int. Cl.
*H01M 10/04* (2006.01)
*H01M 4/04* (2006.01)
(Continued)

(52) U.S. Cl.
CPC ..... *H01M 10/0468* (2013.01); *H01M 4/0435* (2013.01); *H01M 4/134* (2013.01);
(Continued)

(58) Field of Classification Search
CPC ........... H01M 10/0468; H01M 4/0435; H01M 4/134; H01M 4/625; H01M 10/0562; H01M 10/0585; H01M 2300/0068
See application file for complete search history.

(56) References Cited

U.S. PATENT DOCUMENTS

| 4,879,967 A * | 11/1989 | Sengoku | B05C 1/0826 118/259 |
| 2011/0281170 A1* | 11/2011 | Mitsuda | H01G 11/70 29/25.03 |

(Continued)

FOREIGN PATENT DOCUMENTS

| JP | 2004273181 A | 9/2004 |
| JP | 2012074402 A | 4/2012 |

(Continued)

*Primary Examiner* — Brian R Ohara
*Assistant Examiner* — Emily Elizabeth Freeman
(74) *Attorney, Agent, or Firm* — Dickinson Wright, PLLC

(57) ABSTRACT

An all-solid-state battery manufacturing apparatus disclosed herein includes a transport apparatus, a press roller, and an adhesive provision apparatus. The transport apparatus transports an active material layer. The press roller has a foil attachment surface, which is a cylindrical surface to which the current collection foil is to be attached. The press roller rotates and moves the current collection foil attached to the foil attachment surface to the surface of the active material layer being transported by the transport apparatus and presses the current collection foil and the active material layer between the press roller and the transport apparatus. The adhesive provision apparatus is provided on a movement path of the current collection foil rotated and moved by the foil attachment surface of the press roller, and provides an adhesive to the current collection foil attached to the press roller.

7 Claims, 2 Drawing Sheets

(51) Int. Cl.
*H01M 4/134* (2010.01)
*H01M 4/62* (2006.01)
*H01M 10/0562* (2010.01)
*H01M 10/0585* (2010.01)

(52) U.S. Cl.
CPC ....... *H01M 4/625* (2013.01); *H01M 10/0562* (2013.01); *H01M 10/0585* (2013.01); *H01M 2300/0068* (2013.01)

(56) References Cited

U.S. PATENT DOCUMENTS

| | | | |
|---|---|---|---|
| 2014/0363636 A1* | 12/2014 | Gubler | B32B 37/0053 428/196 |
| 2015/0353780 A1* | 12/2015 | Yoshida | H01G 11/32 252/511 |
| 2020/0119333 A1* | 4/2020 | Masuzawa | H01M 4/622 |
| 2021/0083299 A1* | 3/2021 | Ozawa | H01M 4/621 |
| 2022/0231285 A1* | 7/2022 | Kuriki | H01M 4/66 |
| 2022/0263064 A1* | 8/2022 | Nakashima | H01M 10/052 |

FOREIGN PATENT DOCUMENTS

| | | |
|---|---|---|
| JP | 2012160352 A | 8/2012 |
| JP | 2017204377 A | 11/2017 |

* cited by examiner

ALL-SOLID-STATE BATTERY MANUFACTURING APPARATUS AND ALL-SOLID-STATE BATTERY MANUFACTURING METHOD

CROSS-REFERENCE TO RELATED APPLICATIONS

The present specification claims priority on the basis of Japanese Patent Application No. 2020-118341 filed on Jul. 9, 2020, the contents of which are incorporated by reference herein in their entirety.

BACKGROUND OF THE INVENTION

1. Field of the Invention

The present teaching relates to an all-solid-state battery manufacturing apparatus and an all-solid-state battery manufacturing method.

2. Description of the Related Art

Secondary batteries have widely been used as portable power sources for personal computers, mobile telephones, and the like, and as vehicle driving power sources for EVs (electric vehicles), HVs (hybrid vehicles), PHVs (plug-in hybrid vehicles), and the like. As one example of a secondary battery, development of an all-solid-state battery using a solid electrolyte instead of a liquid electrolyte has been progressing. In an all-solid-state battery, a first current collector, a first active material layer, a solid electrolyte layer, a second active material layer, and a second current collector are stacked in the stated order. If the relative positions of the multiple stacked layers shift, there is a possibility that the battery performance will change. Accordingly, in order to suppress shifting of the positions of the multiple layers, a technique has been proposed in which two layers that are adjacent to each other are adhered. For example, an all-solid-state battery disclosed in Japanese Patent Application Publication No. 2017-204377 is manufactured by adhering a first current collector and a first active material layer using a thermoplastic resin.

SUMMARY

According to the conventional all-solid-state battery manufacturing method, multiple layers are bonded by heating and compressing the multiple layers in a stacking direction using a flat plate in a state in which adhesive has been arranged between the layers to be adhered. With this method, it is difficult to shorten the amount of manufacturing time. Accordingly, a method according to which multiple layers can be adhered more suitably has been desired.

A typical object of the present teaching is to provide an all-solid-state battery manufacturing apparatus and an all-solid-state battery manufacturing method which enable multiple layers constituting a battery to be adhered more appropriately.

In order to realize the object, an all-solid-state battery manufacturing apparatus according to an aspect disclosed here is a manufacturing apparatus for manufacturing an all-solid-state battery in which a current collection foil and an active material layer are stacked, the manufacturing apparatus including: a transport apparatus configured to transport the active material layer supported on a support surface; a press roller that has a foil attachment surface, which is a cylindrical surface to which the current collection foil supplied from the outside is to be attached, and that is configured to rotate and move the current collection foil attached to the foil attachment surface to a surface of the active material layer being transported by the transport apparatus by rotating using a central axis of the cylindrical surface as a rotational axis, and to press the current collection foil and the active material layer in a thickness direction between the press roller and the support surface of the transport apparatus; and an adhesive provision apparatus that is provided on a movement path of the current collection foil rotated and moved by the foil attachment surface of the press roller, and that is configured to provide an adhesive to the current collection foil attached to the press roller.

With the all-solid-state battery manufacturing apparatus according to the present disclosure, the current collection foil provided with the adhesive and the active material layer can be stacked and pressed (compressed) while the current collection foil is rotated and moved by the press roller. Accordingly, it is possible to adhere the current collection foil and the active material layer in a shorter amount of time compared to the case of pressing the current collection foil and the active material layer using a flat plate or the like.

In one desirable aspect of the manufacturing apparatus disclosed herein, the adhesive provision apparatus includes an adhesive roller. The adhesive roller includes an adhesive contact surface, which is a cylinder surface that comes into contact with the adhesive. The adhesive roller adjusts a thickness of the adhesive on the current collection foil attached to the foil attachment surface of the press roller by rotating using an axis parallel to the rotational axis of the press roller as a rotational axis.

If the current collection foil and the active material layer are pressed using the flat plate, it is possible to reduce the thickness of the adhesive between the current collection foil and the active material layer by extending the amount of pressing time. However, as described above, it is difficult to shorten the amount of manufacturing time if the flat plate is used. Also, if the current collection foil and the active material layer are simply pressed using the press roller, the amount of time for which the pressing pressure is applied is shortened, and therefore there is also a possibility that the thickness of the adhesive between the current collection foil and the active material layer will not decrease and the shape of the stacked body of the all-solid-state battery will be disturbed. If the shape of the stacked body is disturbed, deterioration of the battery performance and the like will occur in some cases as well. In contrast to this, due to the thickness of the adhesive attached on the current collection foil being adjusted (reduced) in advance by the adhesive roller, the current collection foil and the active material layer are adhered in a short amount of time and the shape of the stacked body is also less likely to be disturbed. Accordingly, the current collection foil and the active material layer are adhered more suitably.

In one desirable aspect of the manufacturing apparatus disclosed herein, the adhesive provision apparatus further includes a supply apparatus that supplies adhesive to the adhesive contact surface of the adhesive roller. The adhesive roller adjusts the thickness of the adhesive while transferring the adhesive supplied to the adhesive contact surface by the supply apparatus to the current collection foil attached to the foil attachment surface. In this case, the step of providing the adhesive to the current collection foil and the step of adjusting the thickness of the adhesive on the current collection foil are performed at the same time (in parallel). Accordingly, the current collection foil and the active material layer are adhered more efficiently. However, the adhesive may also be provided to the current collection foil using a method other than transfer using the adhesive roller (e.g., a method such as dripping, coating, or spraying).

In one desirable aspect of the manufacturing apparatus disclosed herein, the adhesive is a photocurable adhesive that is cured due to a curing light being emitted thereto. The manufacturing apparatus further includes a curing light emission unit configured to emit the curing light to the adhesive on the current collection foil attached to the press roller. In this case, unlike the case of using a hot melt that is melted by being heated as the adhesive, there is no need to heat the adhesive, and therefore the manufacturing efficiency is further improved and there is no adverse effect on the members of the all-solid-state battery due to heat. Furthermore, even if the temperature of the all-solid-state battery rises during use, the adhesive is not melted, and therefore the shape is not likely to change either. Accordingly, the current collection foil and the active material layer are adhered more suitably. However, it is also possible to use a hot melt or the like as the adhesive.

In a desirable aspect of the manufacturing apparatus disclosed herein, at least a portion of the adhesive roller is made of a material through which the curing light passes. A curing light emission unit emits the curing light through the adhesive roller to the adhesive on the current collection foil attached to the press roller. In this case, the curing light is emitted to the adhesive while the thickness of the adhesive on the current collection foil is adjusted by the adhesive roller. Accordingly, the degree of freedom in the arrangement of the apparatuses improve, and the current collection foil and the active material layer are adhered more efficiently. However, it is also possible to emit the curing light to the adhesive without allowing the curing light to pass through the adhesive roller.

In one desirable aspect of the manufacturing apparatus disclosed herein, the press roller includes a plurality of ventilation holes that extend from the foil attachment surface to the interior. The press roller attaches the current collection foil to the foil attachment surface by suctioning a gas from the ventilation holes to the interior. In this case, the press roller can easily and suitably attach the current collection foil to the foil attachment surface.

In one desirable aspect of the manufacturing apparatus disclosed herein, a viscosity of the adhesive when provided to the current collection foil is 100 mPa·s to 5000 mPa·s. In this case, the adhesive is suitably provided to the current collection foil and adhesion of the current collection foil and the active material layer is also performed suitably. Also, in the case where the surface of the current collection foil is coated with carbon, if the viscosity of the adhesive is too low, there is a possibility that the adhesive will excessively permeate the carbon layer and the current collection foil and the active material layer will not be sufficiently adhered. Conversely, if the viscosity of the adhesive is too high, there is a possibility that the adhesive will not be likely to permeate the carbon layer and the thickness of the adhesive will not decrease sufficiently. Accordingly, if the surface of the current collection foil is coated with carbon, the viscosity of the adhesive may be 500 mPa·s to 1500 mPa·s. In this case, it is possible to obtain a favorable adhesive thickness and adhesiveness.

An all-solid-state battery manufacturing method according to one aspect disclosed herein is a manufacturing method for manufacturing an all-solid-state battery in which a current collection foil and an active material layer are stacked, the manufacturing method including: a current collection foil attachment step of attaching the current collection foil to a foil attachment surface of a press roller that includes the foil attachment surface, which is a cylindrical surface, and that is configured to rotate using a central axis of the cylindrical surface as a rotational axis; an adhesive provision step of providing an adhesive on the current collection foil attached to the foil attachment surface; and a pressing step of rotating and moving the current collection foil attached to the foil attachment surface to a surface of the active material layer being transported by a transport apparatus by rotating the press roller, and pressing the current collection foil and the active material layer in a thickness direction between the press roller and the transport apparatus.

According to the all-solid-state battery manufacturing method according to the present disclosure, the current collection foil provided with the adhesive and the active material layer can be stacked and pressed (compressed) while the current collection foil is rotated and moved using a press roller. Accordingly, it is possible to adhere the current collection foil and the active material layer in a shorter amount of time compared to the case of pressing the current collection foil and the active material layer using a flat plate or the like.

One favorable aspect of the manufacturing method disclosed herein further includes a thickness adjustment step. In the thickness adjustment step, the thickness of the adhesive is adjusted by bringing an adhesive contact surface of an adhesive roller that has the adhesive contact surface, which is a cylinder surface, and that is configured to rotate using an axis parallel to the rotational axis of the press roller as the rotational axis into contact with the adhesive on the current collection foil attached to the foil attachment surface. In this case, as described above, the thickness of the adhesive attached on the current collection foil is adjusted in advance using the adhesive roller, and thereby the current collection foil and the active material layer are adhered in a short amount of time, and the shape of the stacked body is less likely to be disturbed.

In one suitable aspect of the manufacturing method disclosed herein, the adhesive provision step and the thickness adjustment step are performed at the same time by transferring the adhesive supplied to the adhesive contact surface of the adhesive roller to the current collection foil attached to the foil attachment surface. In this case, the current collection foil and the active material layer are adhered more efficiently.

In one desirable aspect of the manufacturing method disclosed herein, the adhesive is a photocurable adhesive that is cured due to a curing light being emitted thereto, and a photocurable adhesive that is cured due to a curing light such as ultraviolet rays and/or visible light rays being emitted thereto is desirable. The manufacturing method further includes a curing light emission step of emitting the curing light to the adhesive. In this case, there is no need to heat the adhesive, and therefore the manufacturing efficiency further improves, and there is no adverse effect on the material of the all-solid-state battery due to heat. Furthermore, the shape is less likely to change due to heating of the all-solid-state battery when in use.

In one favorable aspect of the manufacturing method disclosed herein, a viscosity of the adhesive when provided to the current collection foil is 100 mPa·s to 5000 mPa·s. Also, if the surface of the current collection foil is coated with carbon, the viscosity of the adhesive may be 500 mPa·s to 1500 mPa·s. In this case, as described above, the current collection foil and the active material layer are adhered more suitably.

DETAILED DESCRIPTION OF THE PREFERRED EMBODIMENTS

Figure 1:
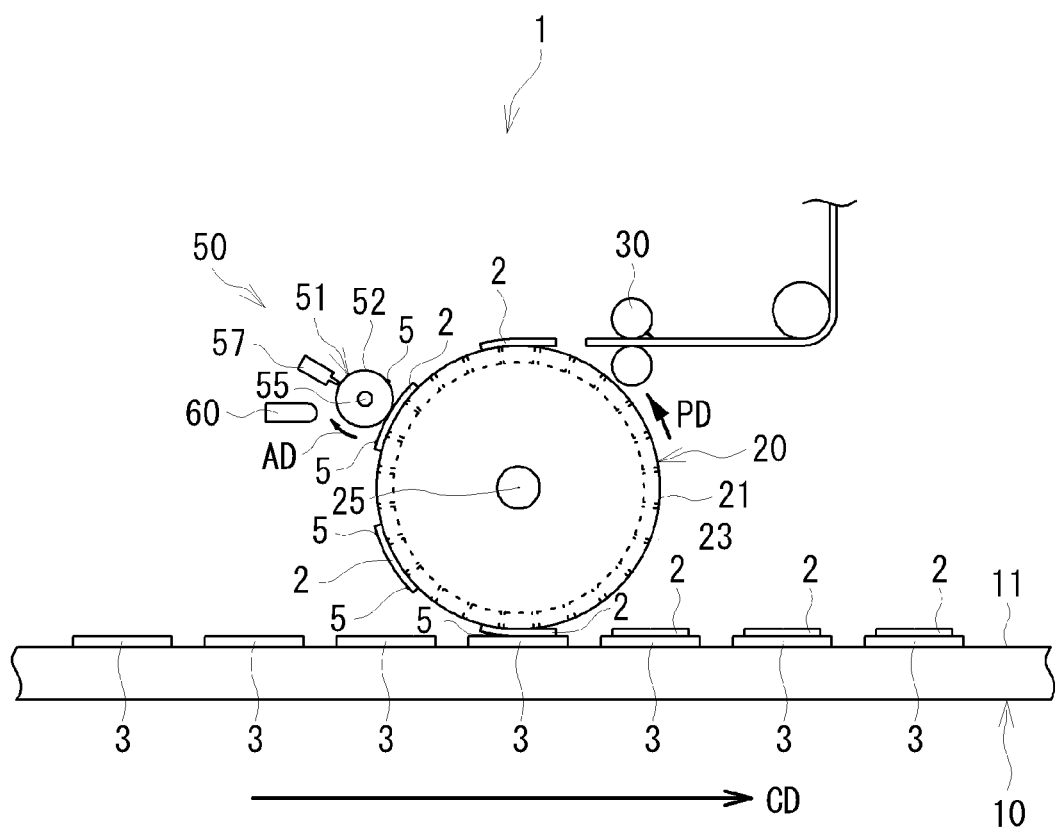
FIG. 1 is a side view of an all-solid-state battery manufacturing apparatus 1.

Hereinafter, one typical embodiment of the present disclosure will be described in detail with reference to the drawings. Unless specifically mentioned in the present specification, items that are needed for implementation (e.g., configurations of the all-solid-state battery, etc.) can be understood as items to be designed by a person skilled in the art based on the conventional techniques of the field. The all-solid-state battery manufacturing apparatus and manufacturing method disclosed herein can be implemented based on the content disclosed in the present specification and common technical knowledge in the field. It should be noted that in the following drawings, members and portions that exhibit the same effects are denoted by the same reference numerals and described. Also, the dimensional relationships (length, width, thickness, etc.) in the drawings do not reflect the actual dimensional relationships.

All-Solid-State Battery

First, an overall configuration of an all-solid-state lithium ion secondary battery (hereinafter referred to simply as an "all-solid-state battery" in some cases as well), which is one example of an all-solid-state battery manufactured using the manufacturing apparatus and the manufacturing method illustrated in the present disclosure, will be described. However, the all-solid-state battery to which the manufacturing method of the present disclosure is to be applied is not limited to an all-solid-state lithium ion secondary battery. That is, the all-solid-state battery may also be an all-solid-state battery in which a metal ion other than a lithium ion is used as a charge carrier, such as a sodium ion secondary battery, a magnesium ion secondary battery, or the like.

The all-solid-state battery in the present disclosure is manufactured by stacking multiple battery units, which are stacked bodies. The battery unit includes a positive electrode current collector, a positive electrode active material layer, a solid electrolyte layer, a negative electrode active material layer, and a negative electrode current collector.

The solid electrolyte layer includes at least a solid electrolyte. Examples of solid electrolytes include sulfide-based solid electrolytes and oxide-based solid electrolytes. Examples of sulfide-based solid electrolytes include glass or glass ceramics that are $Li_2S$—$SiS_2$-based, $Li_2S$—$P_2S_3$-based, $Li_2S$—$P_2S_5$-based, $Li_2S$—$GeS_2$-based, $Li_2S$—$B_2S_3$-based, or the like. Examples of oxide-based solid electrolytes include various oxides having a NASICON structure, a garnet-type structure, or a perovskite-type structure. The solid electrolyte is, for example, in the form of particles. The solid electrolyte layer contains a binder (binding material) such as butadiene rubber.

The positive electrode active material layer includes at least a positive electrode active material. The positive electrode active material layer desirably further includes a solid electrolyte, and may further include a conductive material, a binder, or the like. For example, known conductive materials such as VGCF and acetylene black can be used as the conductive material of the positive electrode active material layer. For example, a fluorine-containing resin such as polyvinylidene fluoride or the like can be used as the binder of the positive electrode active material layer. Various compounds that have been conventionally used in this type of battery can be used as the positive electrode active material. Examples of the positive electrode active material include composite oxides with layered structures, such as $LiCoO_2$ and $LiNiO_2$, composite oxides with spinel structures, such as $Li_2NiMn_3O_8$ and $LiMn_2O_4$, and composite compounds with olivine structures, such as $LiFePO_4$. The same type of material as the solid electrolyte contained in the solid electrolyte layer can be used as the solid electrolyte in the positive electrode active material layer. The positive electrolyte active material is, for example, in the form of particles.

The negative electrode active material layer includes at least a negative electrode active material. The negative electrode active material layer desirably further includes a solid electrolyte, and may further include a conductive material, a binder, or the like. For example, a known conductive material such as acetylene black can be used as the conductive material of the negative electrode active material layer. For example, a fluorine-containing resin such as polyvinylidene fluoride can be used as the binder of the negative electrode active material layer. Various compounds that have been conventionally used in this type of battery can be used as the negative electrode active material. Examples of the negative electrode active material include carbon-based negative electrode active materials such as graphite, mesocarbon microbeads, and carbon black. Also, examples of the negative electrode active material include a negative electrode active material in which silicon (Si) or tin (Sn) is used as a constituent element. The same type of material as the solid electrolyte contained in the solid electrolyte layer can be used as the solid electrolyte in the negative electrode active material layer. The negative electrolyte active material is, for example, in the form of particles.

A positive electrode current collector that is used as a positive electrode current collector of this type of battery can be used without any particular restriction as the positive electrode current collector. Typically, it is desirable that the positive electrode current collector is made of a metal that has a favorable conductivity. For example, the positive electrode current collector may also be constituted by a metal material such as aluminum, nickel, chromium, gold, platinum, titanium, zinc, and stainless steel. It should be noted that the positive electrode current collector of the present embodiment is a metal foil (current collection foil), and has a surface that is coated with a carbon layer having a thickness of about 3 μm. A negative electrode current collector that is used as a negative electrode current collector of this type of battery can be used without any particular restriction as the negative electrode current collector. Typically, it is desirable that the negative electrode current collector is made of a metal that has a favorable conductivity. For example, copper (copper foil) or an alloy consisting mainly of copper; aluminum, nickel, iron, titanium, zinc, or the like can be used as the negative electrode current collector.

Manufacturing Apparatus

An all-solid-state battery manufacturing apparatus 1 in the present embodiment will be described with reference to FIG. 1. The manufacturing apparatus 1 manufactures the battery unit of the all-solid-state battery by adhering a current collection foil 2 to an active material layer 3 using an adhesive 5. In one example, in the manufacturing apparatus 1 of the present embodiment, the current collection foil 2, which is a positive electrode current collector, is stacked on and adhered to the active material layer 3, which is a positive electrode active material layer. However, the manufacturing apparatus 1 may also be used in the case of adhering the current collection foil, which is a negative electrode current collector, to a negative electrode active material layer. Also, hereinafter, in order to simplify the description, the current collection foil 2 is stacked on (adhered to) the active material layer 3 in a state in which the active material layer 3 has not yet been stacked on another layer (e.g., at least one of a solid electrolyte layer, an opposing electrode active material layer, and an opposing electrode current collector). However, the manufacturing apparatus 1 may also stack and adhere the current collection foil 2 on the surface of the active material layer 3 that has already been stacked on another layer.

The manufacturing apparatus 1 of the present embodiment includes a transport apparatus 10, a press roller 20, a supply/cutting apparatus 30, an adhesive provision apparatus 50, and a curing light emission unit 60.

The transport apparatus 10 transports the active material layer 3 along a transport direction CD in a state in which the active material layer 3 is supported on a support surface 11. The support surface 11 may be, for example, a conveyor belt or the like. Although the details will be described later, the support surface 11 is used also as a pressing surface that presses the current collection foil 2 and the active material layer 3. Accordingly, it is desirable that the support surface 11 is made of a material having an appropriate degree of rigidity. In the present embodiment, multiple active material layers 3 formed at a uniform size are transported continuously by the transport apparatus 10. Accordingly, the all-solid-state battery manufacturing time is easily shortened. Also, in the present embodiment, one (bottom surface) of a pair of wide surfaces of the active material layer 3 formed into a flat plate shape is supported by the support surface 11. As a result, the other (hereinafter referred to as "outer surface") of the pair of wide surfaces faces upward. However, as described before, the active material layer 3 transported by the transport apparatus 10 may be stacked on another layer. In this case, the other layer stacked on the active material layer 3 comes into contact with the support surface 11 and the active material layer 3 faces upward.

The press roller 20 is a member with an approximately tubular outer shape or an approximately cylindrical outer shape. In other words, the outer circumferential surface of the press roller 20 is a cylinder surface. The press roller 20 attaches the current collection foil 2 that is supplied from the outside to the foil attachment surface 21, which is a cylindrical surface. The press roller 20 rotates in an arrow direction PD using the central axis of the cylindrical surface (foil attachment surface 21) as the rotational axis 25. The rotational axis 25 extends in a horizontal direction, orthogonal to the transport direction of the active material layer 3 transported by the transport apparatus 10.

The press roller 20 in the present embodiment includes multiple ventilation holes 23 that extend from the foil attachment surface 21, which is the cylindrical surface, to the interior. Although many ventilation holes 23 are provided on the foil attachment surface 21, only a portion of the multiple ventilation holes 23 are indicated by the dotted lines in FIG. 1. The press roller 20 attaches the current collection foil 2 to the foil attachment surface 21 by suctioning a gas (air) from the ventilation holes 23 into the interior.

It should be noted that the press roller 20 (or the control unit of the manufacturing apparatus 1) in the present embodiment switches between attachment of the current collection foil 2 to the foil attachment surface 21 and separation of the current collection foil 2 from the foil attachment surface 21 by switching between suction of the gas from the respective ventilation holes 23 and stopping of suction (or discharge) according to the position. Specifically, the press roller 20 in the present embodiment discharges the air to the outside from the ventilation hole 23 which has rotated to the lowest position (i.e., the ventilation hole 23 at the closest position to the transport apparatus 10) among the many ventilation holes 23 provided in the peripheral direction. Also, the press roller 20 suctions gas into the interior from the ventilation holes 23 located in at least region in the foil attachment surface 21 where the current collection foil 2 is to be attached.

However, it is also possible to change the principle for attaching the current collection foil 2 to the foil attachment surface 21. For example, the current collection foil 2 may also be attached to the foil attachment surface 21 using static electricity or the like. Also, if the adhesive force between the current collection foil 2 and the foil attachment surface 21 is weaker than the attachment force (to be described in detail later) of the adhesive 5 between the current collection foil 2 and the active material layer 3, the press roller 20 need not include the configuration of separating the current collection foil 2 attached to the foil attachment surface 21.

The supply/cutting apparatus 30 supplies the current collection foil 2 from the outside to the press roller 20. Also, the supply/cutting apparatus 30 in the present embodiment cuts the current collection foil 2 having an elongated shape to a predetermined length and supplies the cut current collection foil 2 to the press roller 20. In the present embodiment, the supply/cutting apparatus 30 is provided above the press roller 20. The current collection foil 2 that was cut and supplied to the upper portion of the press roller 20 attaches to the foil attachment surface 21.

The supply/cutting apparatus 30 in the present embodiment supplies the current collection foil 2 to the upper portion of the press roller 20 by rotating a pair of rollers in a state in which the current collection foil 2 is sandwiched between the pair of rollers. Also, a cutter is provided on at least one of the pair of rollers. The pair of rollers rotate, and when the length of the current collection foil 2 to be supplied to the press roller 20 side reaches a predetermined length, the current collection foil 2 is cut by the cutter. The supply/cutting apparatus 30 continuously supplies the current collection foils 2 of the predetermined length to the press roller 20. The operation of the supply/cutting apparatus 30 is controlled by the control unit of the manufacturing apparatus 1. It should be noted that it goes without saying that the configuration of the supply/cutting apparatus 30 can be changed.

The press roller 20 rotates and moves the current collection foil 2 that was supplied by the supply/cutting apparatus 30 and attached to the foil attachment surface 21 from the upper portion to the outer surface of the active material layer 3 transported by the transport apparatus 10 at the lower position. At this time, the adhesive 5 (to be described in detail later) provided on the current collection foil 2 is sandwiched between the current collection foil 2 and the active material layer 3. Furthermore, the press roller 20 presses the current collection foil 2 and the active material layer 3 in the thickness direction (the vertical direction in FIG. 1) between the press roller 20 and the support surface 11 of the transport apparatus 10. That is, the manufacturing apparatus 1 can stack and press the current collection foil 2 and the active material layer 3 while rotating and moving the current collection foil 2 using the press roller 20. Accordingly, it is possible to stack (adhere) the current collection foil 2 and the active material layer 3 in a shorter amount of time compared to the case of pressing the active material layer using a flat plate or the like.

The adhesive provision apparatus 50 is provided on the movement route (in the present embodiment, the movement route from the upper portion to which the current collection foil 2 is supplied to the lower portion at which the current collection foil 2 is stacked on the active material layer 3) of the current collection foil 2 that is rotated and moved by the foil attachment surface 21 of the press roller 20. The adhesive provision apparatus 50 provides the adhesive 5 to the current collection 2 attached to the press roller 20.

The adhesive provision apparatus 50 in the present embodiment includes an adhesive roller 51. The adhesive roller 51 is a member with an approximately cylindrical outer shape or an approximately circular columnar outer shape. In other words, the outer circumferential surface of the adhesive roller 51 is a cylindrical surface. The cylindrical surface of the adhesive roller 51 is an adhesive contact surface 52 that comes into contact with the adhesive 5. The adhesive roller 51 rotates in the direction of the arrow AD using the central axis of the cylindrical surface (adhesive contact surface 52) as the rotational axis 55. The rotational axis 55 of the adhesive roller 51 is parallel to the rotational axis 25 of the press roller 20. Also, the rotation direction PD of the press roller 20 is the direction opposite to the rotation direction AD of the adhesive roller 51. The distance between the adhesive contact surface 52 of the adhesive roller 51 and the foil attachment surface 21 of the press roller 20 is set to a predetermined distance according to the adjustment amount of the thickness of the later-described adhesive 5.

The adhesive provision apparatus 50 includes a supply apparatus 57. The supply apparatus 57 supplies the adhesive 5 to the adhesive contact surface 52 of the adhesive roller 51. Various methods (e.g., dripping, coating, spraying, etc.) can be used as the method for supplying the adhesive 5 to the adhesive contact surface 52 using the supply apparatus 57. The adhesive 5 supplied from the supply apparatus 57 to the adhesive contact surface 52 rotates and moves in the arrow AD direction and is transferred onto the current collection foil 2 attached to the foil attachment surface 21 of the press roller 20. The supply location, supply amount, and supply timing for supplying the adhesive from the supply apparatus 57 to the adhesive contact surface 52 are suitably adjusted. As a result, a suitable amount of the adhesive 5 is transferred to a suitable position of the current collection foil 2 that is being rotated and moved by the press roller 20.

With the manufacturing apparatus 1 of the present embodiment, the thickness of the adhesive 5 on the current collection foil 2 is adjusted due to the adhesive contact surface 52 of the adhesive roller 51 coming into contact with the adhesive 5 provided on the current collection foil 2. Since the rotation direction PD of the press roller 20 is the opposite direction to the rotation direction AD of the adhesive roller 51, the thickness of the adhesive 5 on the current collection foil 2 is suitably adjusted without being adversely influenced by friction or the like. In one example, in the present embodiment, the thickness of the adhesive 5 on the current collection foil 2 is adjusted to 2 μm or less by the adhesive roller 51. Thereafter, the current collection foil 2 and the active material layer 3 is pressed in the thickness direction by the press roller 20 in a state in which the adhesive 5 whose thickness was adjusted in advance is sandwiched between the current collection foil 2 and the active material layer 3. Accordingly, even if the current collection foil 2 and the active material layer 3 are pressed by the press roller 20, according to which the time of applying the pressing pressure is likely to be shortened, the thickness of the adhesive 5 is likely to reach a suitable thickness or less. As a result, the likelihood that the shape of the battery unit (stacked body) of the all-solid-state battery will be disturbed due to the influence of the thickness of the adhesive 5. Accordingly, with the manufacturing apparatus 1 of the present disclosure, the current collection foil 2 and the active material layer 3 are suitably attached in a short amount of time.

Also, the adhesive roller 51 in the present embodiment transfers the adhesive 5 to the current collection foil 2 of the foil attachment surface 21 while adjusting the thickness of the transferred adhesive 5. That is, in the present embodiment, the step of providing the adhesive 5 to the current collection foil 2 and the step of adjusting the thickness of the adhesive 5 on the current collection foil 2 are performed at the same time. Accordingly, the current collection foil 2 and the active material layer 3 are adhered more efficiently.

The adhesive 5 is a photocurable adhesive that is cured due to a curing light being emitted thereto, and is desirably a photocurable adhesive that is cured due to a curing light such as ultraviolet rays and/or visible light rays being emitted thereto. In one example, in the present embodiment, the adhesive 5 including a photocurable acrylic compound is used. When an adhesive 5 that includes a photoradically-curable acrylic compound is used, an adhesive whose cured surface has pressure-sensitive adhesion at room temperature is desirable. However, another photocurable adhesive (e.g., at least one of a cationic-photocurable adhesive that is epoxy-based or the like, a silicon-based light-and-moisture-curable adhesive, and the like) may also be used. When a photocurable adhesive is used, there is no need to heat the adhesive 5, unlike the case where a hot melt is used as the adhesive. Therefore, the manufacturing efficiency further improves and there is no adverse effect on the member of the all-solid-state battery due to heat. Furthermore, even if the temperature of the all-solid-state battery rises during use, the adhesive 5 is not melted, and therefore the shape is not likely to change either. Accordingly, the current collection foil 2 and the active material layer 3 are adhered more suitably.

The curing light emission unit 60 emits the curing light to the adhesive 5. The adhesive 5 in the present embodiment starts a curing reaction when the curing light is emitted thereto from the curing light emission unit 60, and the adhesive 5 is sufficiently cured after the pressing of the current collection foil 2 and the active material layer 3 by the press roller 20.

Specifically, at least a portion of the adhesive roller 51 in the present embodiment is made of a material through which the curing light passes. The curing light emission unit 60 emits the curing light through the adhesive roller 51 to the adhesive 5 on the current collection foil attached to the press roller 20. Accordingly, the curing light is emitted to the adhesive 5 while the thickness of the adhesive 5 on the current collection foil 2 is adjusted by the adhesive roller 51. Accordingly, the degree of freedom in the arrangement of the apparatuses improves and the current collection foil 2 and the active material layer 3 are adhered more efficiently. Furthermore, if an adhesive 5 including a photoradically-curable acrylic compound is used and photocured, polymerization is hindered by the oxygen in the air, and it is known that this becomes prominent when the thickness is about several μms. On the other hand, as in the present embodiment, by using a configuration in which a material through which a curing light passes, or desirably, a material through which ultraviolet light and/or visible light passes is used as the material of the rollers 51, and the curing light is emitted to the adhesive 5 at a location with which the roller 51 is in contact, it is possible to favorably cure the adhesive 5 without causing inhibition of polymerization, even if an adhesive 5 that includes a photoradically-curable acrylic compound is used.

The viscosity of the adhesive 5 when provided to the current collection foil 2 is 100 mPa·s to 5000 mPa·s. In this case, the adhesive 5 is suitably provided to the current collection foil 2 and the adhesion of the current collection foil 2 and the active material layer 3 is also performed suitably. More specifically, the surface of the current collector foil 2 in the present embodiment is coated with a carbon layer. In this case, if the viscosity of the adhesive 5 is too low, there is a possibility that the adhesive 5 will excessively soak into the carbon layer and the current collection foil 2 and the active material layer 3 will not be sufficiently adhered. Conversely, when the viscosity of the adhesive 5 is too high, there is a possibility that the adhesive 5 will be unlikely to permeate the carbon layer and the thickness of the adhesive 5 will not be sufficiently reduced. Accordingly, in the present embodiment, by setting the viscosity of the adhesive 5 when provided to the current collection foil 2 to 500 mPa·s to 1500 mPa·s, a case is suppressed in which the adhesive force decreases due to excessive permeation of the adhesive 5, while the thickness of the adhesive is set to a favorable thickness.

Manufacturing Method

Figure 2:
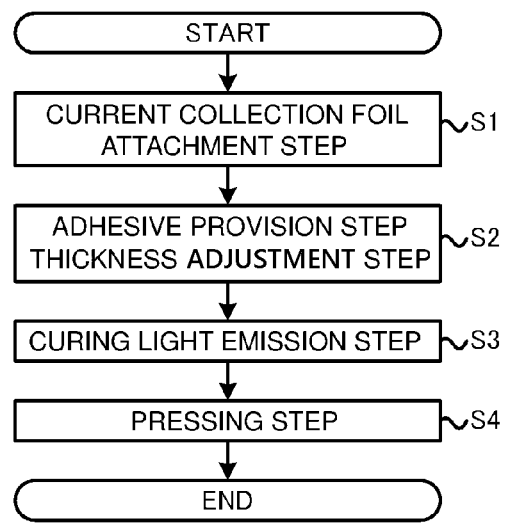
FIG. 2 is a flowchart of an all-solid-state battery manufacturing method.

An all-solid-state battery manufacturing method of the present embodiment will be described with reference to FIG. 2. The manufacturing method illustrated in FIG. 2 is performed using the above-described manufacturing apparatus 1 (see FIG. 1). It should be noted that in the actual manufacturing method, multiple current collection foils 2 and multiple active material layers 3 are sequentially stacked. However, in order to simplify the description, in the flowchart shown in FIG. 2, a step of stacking (adhering) a current collection foil 2 and an active material layer 3 of one set is shown. The all-solid-state battery manufacturing method of the present disclosure includes a current collection foil attachment step (S1), an adhesive provision step and thickness adjustment step (S2), a curing light emission step (S3), and a pressing step (S4).

In the current collection foil attachment step (S1), the current collection foil 2 is attached to the foil attachment surface 21 of the press roller 20. As described above, in the present embodiment, a current collection foil 2 with an elongated shape is cut to a predetermined length by the supply/cutting apparatus 30 and is attached (supplied) to the foil attachment surface 21.

In the adhesive provision step, the adhesive 5 is provided on the current collection foil 2 attached to the foil attachment surface 21. As described above, in the present embodiment, the adhesive 5 is provided on the current collection foil 2 by the adhesive provision apparatus 50.

In the thickness adjustment step, the thickness of the adhesive 5 on the current collection foil 2 is adjusted due to the adhesive contact surface 52 of the adhesive roller 51 coming into contact with the adhesive 5 on the current collection foil 2. As a result, the thickness of the adhesive 5 between the current collection foil 2 and the active material layer 3 after the later-described pressing step (S4) is more likely to reach a suitable thickness or less. Accordingly, the shape of the battery unit of the all-solid-state battery is less likely to be disturbed.

In the present embodiment, the adhesive provision step and the thickness adjustment step are performed at the same time (S2). Specifically, the provision of the adhesive 5 and the adjustment of the thickness of the adhesive are performed at the same time due to the adhesive 5 supplied to the adhesive contact surface 52 of the adhesive roller 51 being transferred onto the current collection foil 2. Accordingly, the manufacturing efficiency further improves.

In the curing light emission step (S3), the curing light is emitted to the adhesive 5. As a result, the curing reaction of the adhesive 5 is suitably started, and therefore both the current collection foil 2 and the active material layer 3 are adhered by the adhesive 5 after being pressed.

In the pressing step (S4), the current collection foil 2 attached to the foil attachment surface 21 is rotated and moved by the press roller 20 to the outer surface of the active material layer 3 transported by the transport apparatus 10. Furthermore, the current collection foil 2 and the active material layer 3 are pressed in the thickness direction between the press roller 20 and the transport apparatus 10. Accordingly, the current collection foil 2 and the active material layer 3 are adhered suitably in a shorter amount of time compared to the case of using a flat plate or the like.

The technique disclosed in the above-described embodiment is merely one example. Accordingly, the technique illustrated in the above-described embodiment can also be changed. For example, a hot melt or the like can also be used as the adhesive instead of the photocurable adhesive. It is also possible to employ only a portion of the multiple techniques illustrated in the above-described embodiment. For example, only one of the technique of adjusting the thickness of the adhesive 5 using the adhesive roller 51 and the technique of setting the viscosity of the adhesive 5 to a suitable viscosity and providing the adhesive 5 to the current collection foil 2 may be employed.

What is claimed is:

1. A manufacturing apparatus for manufacturing an all-solid-state battery in which a current collection foil and an active material layer are stacked, the manufacturing apparatus comprising:
   a transport apparatus configured to transport the active material layer supported on a support surface;
   a press roller that has a foil attachment surface, which is a cylindrical surface to which the current collection foil supplied from the outside is to be attached, and that is configured to rotate and move the current collection foil attached to the foil attachment surface to a surface of the active material layer being transported by the transport apparatus by rotating using a central axis of the cylindrical surface as a rotational axis, and to press the current collection foil and the active material layer in a thickness direction between the press roller and the support surface of the transport apparatus; and
   an adhesive provision apparatus that is provided on a movement path of the current collection foil rotated and moved by the foil attachment surface of the press roller, and that is configured to provide an adhesive to the current collection foil attached to the press roller;
   wherein the press roller includes a plurality of ventilation holes that extend from the foil attachment surface to an interior, and
   the current collection foil is attached to the foil attachment surface due to a gas being suctioned from the ventilation holes to the interior.

2. The manufacturing apparatus according to claim 1, wherein the adhesive provision apparatus includes an adhesive roller that has an adhesive contact surface, which is a cylindrical surface that comes into contact with the adhesive, and the adhesive roller is configured to adjust a thickness of the adhesive on the current collection foil attached to the foil attachment surface by rotating using an axis parallel to the rotational axis of the press roller as a rotational axis.

3. The manufacturing apparatus according to claim 2, wherein the adhesive provision apparatus further includes a supply apparatus configured to supply the adhesive to the adhesive contact surface of the adhesive roller, and the adhesive roller adjusts the thickness of the adhesive while transferring the adhesive supplied to the adhesive contact surface by the supply apparatus to the current collection foil attached to the foil attachment surface.

4. The manufacturing apparatus according to claim 1, wherein the adhesive is a photocurable adhesive that is cured due to a curing light being emitted thereto, and the manufacturing apparatus further comprises a curing light emission unit configured to emit the curing light to the adhesive.

5. The manufacturing apparatus according to claim 2, wherein the adhesive is a photocurable adhesive that is cured due to a curing light being emitted thereto, at least a portion of the adhesive roller is made of a material through which the curing light passes, and the manufacturing apparatus further comprises a curing light emission unit configured to emit the curing light through the adhesive roller to the adhesive on the current collection foil attached to the press roller.

6. The manufacturing apparatus according to claim 1, wherein a viscosity of the adhesive when provided to the current collection foil is 100 mPa·s to 5000 mPa·s.

7. The manufacturing apparatus according to claim 1, wherein a surface of the current collection foil to which the adhesive is to be provided is coated with carbon, and a viscosity of the adhesive when provided to the current collection foil is 500 mPa·s to 1500 mPa·s.

* * * * *